(12) United States Patent
Delaire et al.

(10) Patent No.: US 7,543,601 B2
(45) Date of Patent: *Jun. 9, 2009

(54) PASSIVE PRESSURE ACTIVATION VALVE

(75) Inventors: Gilles Delaire, Chatham (CA); Kirk Ivens, Chatham (CA); Paul D. Perry, Chatham (CA); Andre Veinotte, Dresden (CA)

(73) Assignee: Continental Automotive Canada, Inc., Chatham, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/923,216

(22) Filed: Oct. 24, 2007

(65) Prior Publication Data
US 2008/0041349 A1 Feb. 21, 2008

Related U.S. Application Data

(62) Division of application No. 11/094,789, filed on Mar. 31, 2005.

(60) Provisional application No. 60/558,229, filed on Mar. 31, 2004.

(51) Int. Cl.
*F16K 13/10* (2006.01)
*F02M 33/02* (2006.01)

(52) U.S. Cl. ................................ 137/254; 123/520
(58) Field of Classification Search ............ 137/247.33, 137/247.35, 247.37, 247.39, 247.41, 251, 137/254, 251.1; 123/516, 518, 520
See application file for complete search history.

(56) References Cited

U.S. PATENT DOCUMENTS

| | | | | |
|---|---|---|---|---|
| 2,020,563 A | * | 11/1935 | Moore | 137/177 |
| 2,418,381 A | * | 4/1947 | Wegmann | 137/596 |
| 2,636,507 A | * | 4/1953 | Houghland | 137/252 |
| 4,222,405 A | * | 9/1980 | Rosenblad | 137/216.1 |
| 6,889,669 B1 | * | 5/2005 | Perry et al. | 123/520 |
| 7,302,964 B1 | * | 12/2007 | Perry et al. | 137/254 |
| 2004/0134535 A1 | * | 7/2004 | Mitchell | 137/247.35 |

* cited by examiner

*Primary Examiner*—John Rivell

(57) ABSTRACT

A valve apparatus includes a housing, which defines an interior chamber, a baffle disposed in the interior chamber, and a volume of liquid. The housing includes first, second and third portions. The first portion includes first and second ports that communicate with the interior chamber. The second portion is spaced from the first portion along a longitudinal axis. And the third portion extends along the longitudinal axis between the first and second portions. The baffle at least partially defines a helical fluid flow path between the first and second ports, and the volume of the liquid is disposed in the second portion of the housing.

3 Claims, 17 Drawing Sheets

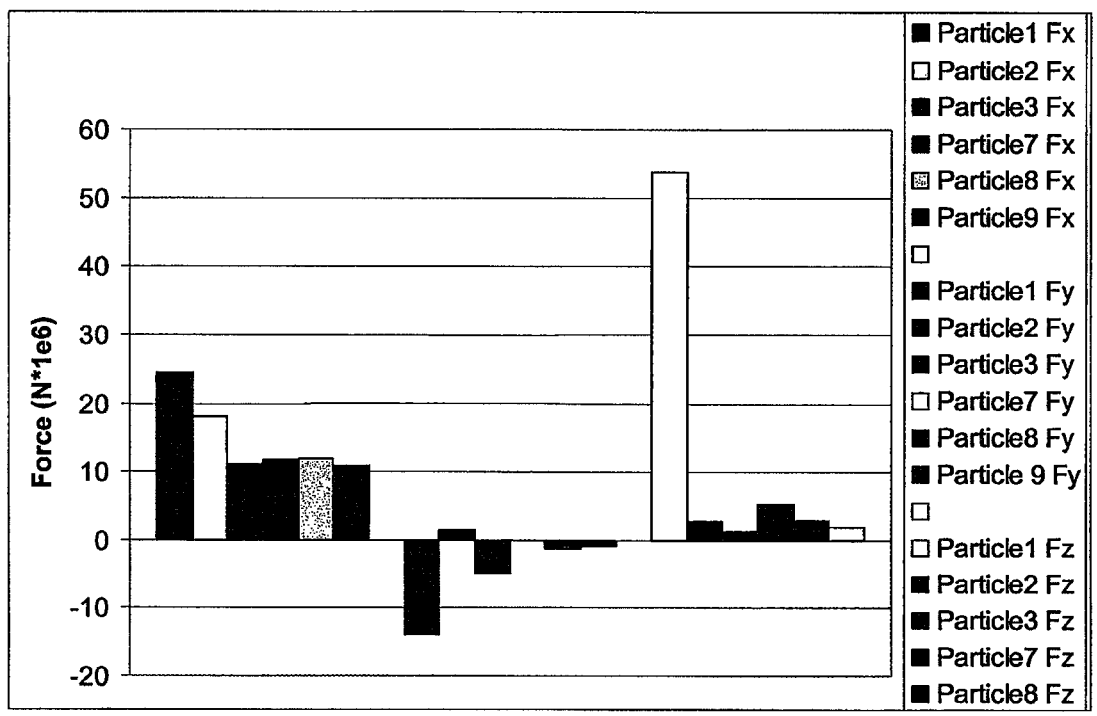
Figure 17
Figure 18
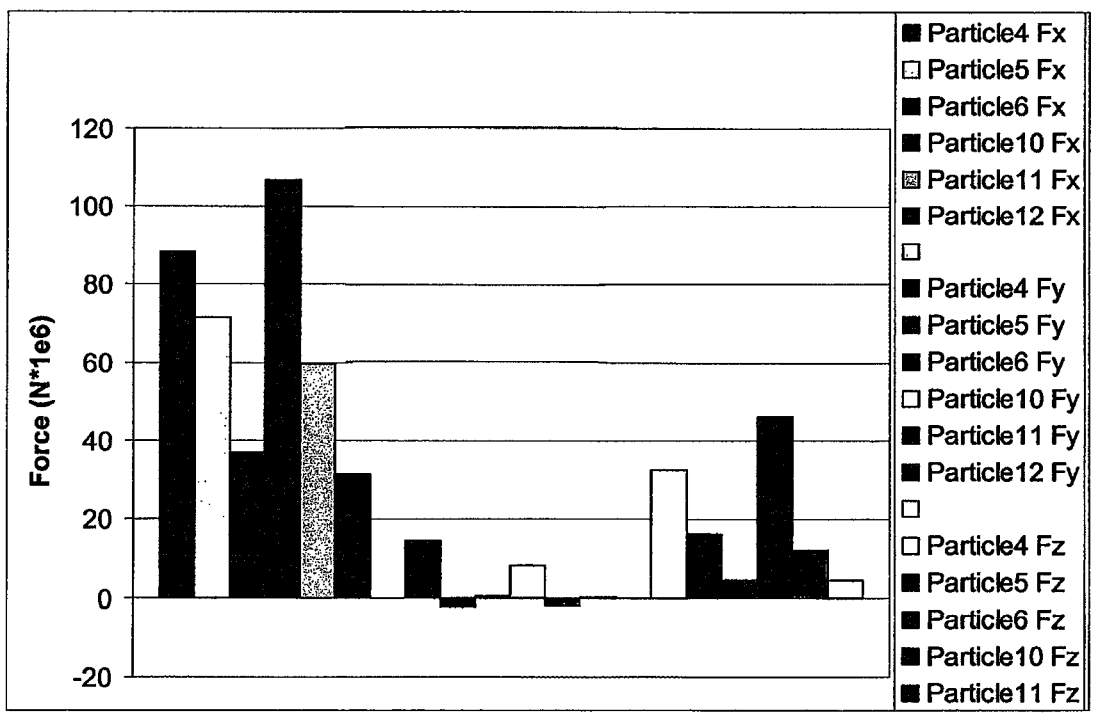

| Table 1A. Results of CFD Analysis | | | | | | |
|---|---|---|---|---|---|---|
| model | | | Figures 10-12 | Figures 13-15 | Figure 17 | Figure 18 |
| mode | | | pressure | vacuum | pressure | vacuum |
| product | | | liquid valve | liquid valve | liquid valve | liquid valve |
| model fraction | | | 1.00 | 1.00 | 1.00 | 1.00 |
| local | esize | ($\mu$m) | | | | |
| global | esize | (mm) | 2.0 | 2.0 | 2.0 | 2.0 |
| | etype | | Ltet | Ltet | Ltet | Ltet |
| Cfdesign | E's | | 293719 | 293719 | 293719 | 293719 |
| Cfdesign | N's | | 91445 | 91445 | 91445 | 91445 |
| | atype | | incomp | incomp | incomp | incomp |
| | iter's | | 200 | 200 | 200 | 200 |
| flow | cpu | (sec) | 10965 | 9176 | 22621 | 22116 |
| flow | cpu | (hr) | 3.046 | 2.549 | 6.284 | 6.143 |
| press cntrl | | | - | - | - | - |
| velocities | | | 0.50 | 0.50 | 0.50 | 0.50 |
| pressure | | | 0.50 | 0.50 | 0.50 | 0.50 |
| turbulence | | | 0.50 | 0.50 | 0.50 | 0.50 |
| eddy viscosity | | | 0.10 | 0.10 | 0.10 | 0.10 |
| density | | | - | - | - | - |
| inlet | P1 | (Pa) | 2242.8 | -996.8 | 2242.8 | -996.8 |
| outlet | P2 | (Pa) | 0 | 0 | 0 | 0 |
| in-out | Pdrop | (Pa) | -2243 | 997 | -2243 | 997 |
| | Pdrop | ("Hg) | -0.7 | 0.3 | -0.7 | 0.3 |
| | Pdrop | (mm Hg) | -16.8 | 7.5 | -16.8 | 7.5 |
| | Pdrop | ("$H_2O$) | -9.0 | 4.0 | -9.0 | 4.0 |
| inlet | m1 | (kg/s) | 0.00205 | -0.00141 | 0.00180 | -0.00130 |
| | v1 | ($m^3$/s) | 0.00170 | -0.00117 | 0.00150 | -0.00108 |
| | Ma1 | (--) | 0.00724 | 0.00725 | 0.00662 | 0.00650 |
| | T1 | (deg C) | 0.000 | 0.000 | 0.000 | 0.000 |
| outlet | m2 | (kg/s) | -0.00202 | 0.00140 | -0.00180 | 0.00129 |
| | V2 | ($m^3$/s) | -0.00168 | 0.00116 | -0.00150 | 0.00107 |
| | Ma2 | (--) | 0.03181 | 0.01933 | 0.02673 | 0.01743 |
| | T2 | (deg C) | 0.000 | 0.000 | 0.000 | 0.000 |
| total model | merr | (%) | 1.24 | 0.43 | 0.10 | 0.74 |
| calculation | mav | (kg/hr) | 7.322 | -5.062 | 6.493 | -4.653 |
| | mav | (g/s) | 2.034 | -1.406 | 1.804 | -1.293 |
| | Vav | (L/m) | 101.30 | -70.03 | 89.83 | -64.38 |
| | Vav* | (SLPM) | 101.75 | 70.34 | 90.22 | 64.66 |
| * Density value of 1.1994 kg/$m^3$ used for SLPM calculation | | | | | | |

Figure 19

| Table 1B. Fluid Particle Forces | | | | | | |
|---|---|---|---|---|---|---|
| model | | | Figures 10-12 | Figures 13-15 | Figure 17 | Figure 18 |
| Particle 1 | Fx | (N * 1e6) | N/A | N/A | 24.365 | N/A |
|  | Fy | (N * 1e6) | N/A | N/A | -13.980 | N/A |
|  | Fz | (N * 1e6) | N/A | N/A | 53.721 | N/A |
| Particle 2 | Fx | (N * 1e6) | N/A | N/A | 18.063 | N/A |
|  | Fy | (N * 1e6) | N/A | N/A | 1.408 | N/A |
|  | Fz | (N * 1e6) | N/A | N/A | 2.809 | N/A |
| Particle 3 | Fx | (N * 1e6) | N/A | N/A | 11.042 | N/A |
|  | Fy | (N * 1e6) | N/A | N/A | -4.922 | N/A |
|  | Fz | (N * 1e6) | N/A | N/A | 1.268 | N/A |
| Particle 4 | Fx | (N * 1e6) | N/A | N/A | N/A | 88.219 |
|  | Fy | (N * 1e6) | N/A | N/A | N/A | 14.448 |
|  | Fz | (N * 1e6) | N/A | N/A | N/A | 32.861 |
| Particle 5 | Fx | (N * 1e6) | N/A | N/A | N/A | 71.490 |
|  | Fy | (N * 1e6) | N/A | N/A | N/A | -2.118 |
|  | Fz | (N * 1e6) | N/A | N/A | N/A | 16.429 |
| Particle 6 | Fx | (N * 1e6) | N/A | N/A | N/A | 37.222 |
|  | Fy | (N * 1e6) | N/A | N/A | N/A | 0.364 |
|  | Fz | (N * 1e6) | N/A | N/A | N/A | 4.498 |
| Particle 7 | Fx | (N * 1e6) | N/A | N/A | 11.763 | N/A |
|  | Fy | (N * 1e6) | N/A | N/A | 0.014 | N/A |
|  | Fz | (N * 1e6) | N/A | N/A | 5.248 | N/A |
| Particle 8 | Fx | (N * 1e6) | N/A | N/A | 11.927 | N/A |
|  | Fy | (N * 1e6) | N/A | N/A | -1.168 | N/A |
|  | Fz | (N * 1e6) | N/A | N/A | 2.903 | N/A |
| Particle 9 | Fx | (N * 1e6) | N/A | N/A | 10.924 | N/A |
|  | Fy | (N * 1e6) | N/A | N/A | -0.923 | N/A |
|  | Fz | (N * 1e6) | N/A | N/A | 2.001 | N/A |
| Particle 10 | Fx | (N * 1e6) | N/A | N/A | N/A | 106.836 |
|  | Fy | (N * 1e6) | N/A | N/A | N/A | 8.345 |
|  | Fz | (N * 1e6) | N/A | N/A | N/A | 46.217 |
| Particle 11 | Fx | (N * 1e6) | N/A | N/A | N/A | 59.605 |
|  | Fy | (N * 1e6) | N/A | N/A | N/A | -1.937 |
|  | Fz | (N * 1e6) | N/A | N/A | N/A | 12.262 |
| Particle 12 | Fx | (N * 1e6) | N/A | N/A | N/A | 31.503 |
|  | Fy | (N * 1e6) | N/A | N/A | N/A | 0.121 |
|  | Fz | (N * 1e6) | N/A | N/A | N/A | 4.619 |

Figure 20 ical agencies, e.g., the U.S. Environmental Protection Agency and the Air Resources Board of the California Environmental Protection Agency, have promulgated standards related to limiting fuel vapor releases into the atmosphere. Thus, it is believed that there is a need to avoid releasing fuel vapors into the atmosphere, and to provide an apparatus and a method for performing a leak diagnostic, so as to comply with these standards.

PASSIVE PRESSURE ACTIVATION VALVE

CROSS REFERENCE TO RELATED APPLICATIONS

This is a division filed pursuant to 35 U.S.C. § 120 and § 121 and claims the benefits of prior U.S. application Ser. No. 11/094,789, filed on Mar. 31, 2005, which claims the benefit of the earlier filing date of U.S. Provisional Application No. 60/558,229, filed 31 Mar. 2004, which is incorporated by reference herein in its entirety.

Related co-pending applications are identified as "Valve Apparatus" (U.S. patent application Ser. No. 10/817,521; filed 5 Apr. 2004), "System and Method of Managing Pressure in a Fuel System" (U.S. patent application Ser. No. 10/817,522; filed 5 Apr. 2004), "Sealing Liquid for a Valve Apparatus" (U.S. patent application Ser. No. 10/821,178; filed 9 Apr. 2004), and "Housing for Valve Apparatus" (U.S. patent application Ser. No. 10/821,179; filed 9 Apr. 2004), all of which are incorporated by reference herein in their entirety.

FIELD OF THE INVENTION

A fuel vapor pressure management apparatus that manages pressure and detects leaks in a fuel system. In particular, a fuel vapor pressure management apparatus using a liquid seal valve that vents positive pressure, vents excess negative pressure, and uses evaporative natural vacuum to perform a leak diagnostic.

BACKGROUND OF THE INVENTION

A known fuel system for vehicles with internal combustion engines can include a canister that accumulates fuel vapor from a headspace of a fuel tank. If there is a leak in the fuel tank, the canister, or any other component of the fuel system, fuel vapor could escape through the leak and be released into the atmosphere instead of being accumulated in the canister. Various government regulatory agencies, e.g., the U.S. Environmental Protection Agency and the Air Resources Board of the California Environmental Protection Agency, have promulgated standards related to limiting fuel vapor releases into the atmosphere. Thus, it is believed that there is a need to avoid releasing fuel vapors into the atmosphere, and to provide an apparatus and a method for performing a leak diagnostic, so as to comply with these standards.

In such known fuel systems, excess fuel vapor can accumulate immediately after engine shutdown, thereby creating a positive pressure in the fuel vapor pressure management In such known fuel systems, excess fuel vapor can accumulate immediately after engine shutdown, thereby creating a positive pressure in the fuel vapor pressure management system. Thereafter, a vacuum in the fuel vapor pressure management system can result from natural system cooling after the engine has been turned off. Excess negative or positive pressure in closed fuel systems can occur under some atmospheric and operating conditions, thereby causing stress on components of these fuel systems.

An automotive on-board diagnostic (OBDII) can perform a leak detection test to determine if there is a leak in the fuel vapor pressure management system, which includes the fuel tank head space, the canister that collects volatile fuel vapors from the head-space, a purge valve and any associated hoses. A vacuum sensing function can perform the leak detection diagnostic. For example, a pressure/vacuum sensor or switch will allow the engine computer to monitor the vacuum that is caused by natural system cooling after the engine has been turned off, and thereby perform the leak detection diagnostic.

A vacuum relief function can provide fail-safe operation of the purge flow system, when the engine is ON, and guarantee that vacuum levels in the fuel tank do not endanger the integrity of the tank, when the engine is OFF. In general, the vacuum relief function should only allow flow at a pressure level below the vacuum sensor level.

A pressure relief function is desirable in order to "blow-off" the positive pressure due to excessive fuel vapor in the fuel vapor pressure management system immediately after engine shutdown. This can facilitate, e.g., expedite, the creation of the vacuum that is caused by the natural system cooling. Another benefit of the pressure relief function is to allow air to exit the tank at high flow rates during tank refueling. This function is commonly known as Onboard Refueling Vapor Recovery (ORVR). In general, the pressure relief function should be at a very low-pressure level in order to minimize the backpressure during refueling, and to limit excess pressure in a hot system.

SUMMARY OF THE INVENTION

The present invention provides a valve apparatus that includes a housing, which defines an interior chamber, a baffle disposed in the interior chamber, and a volume of liquid. The housing includes first, second and third portions. The first portion includes first and second ports that communicate with the interior chamber. The second portion is spaced from the first portion along a longitudinal axis. And the third portion extends along the longitudinal axis between the first and second portions. The baffle at least partially defines a helical fluid flow path between the first and second ports, and the volume of the liquid is disposed in the second portion of the housing.

The present invention also provides a valve apparatus that includes a housing that defines a flow path for a fluid, a liquid that separates the flow path into first and second parts, and means for controlling entrainment of the liquid into a flow of the fluid along the flow path.

The present invention further provides a method of managing vapor pressure in a fuel system supplying fuel to an internal combustion engine. The method includes locating a chamber in fluid communication between first and second ports, disposing within the chamber a liquid separating the chamber into first and second portions, and minimizing entrainment of the liquid in a flow of a fluid between the first and second ports. The first port is in fluid communication with the fuel system, and the second port is in fluid communication with atmosphere.

The inventors have determined, by comparing flow and velocity distribution throughout a helical flow path of the liquid valve, the forces acting on secondary particles in the flow stream and whether these forces propel the particles toward the walls that define the helical flow path.

During the pressure relief and vacuum relief, air passes through the liquid in the valve in the form of air bubbles. The bubbles then burst, which may cause the undesirable spraying of liquid into the air stream that may then be carried away. In order to keep the liquid inside the part, a liquid trap or tortuous path may be used to capture the liquid. According to a preferred embodiment, a multi-turn, helically shaped path captures the liquid. During operation, the liquid droplets are thus forced to a wall of the path, thus providing a centrifuge effect. As a result, liquid loss is substantially reduced or eliminated.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

FIG. 17 is a chart that illustrates the forces of select fluid particles shown in FIG. 16 at a pressure level of +9 inches of water applied during pressure blow-off.

FIG. 18 is a chart that illustrates the forces of select fluid particles shown in FIG. 16 at a pressure level of −4 inches of water applied during pressure vacuum relief.

FIG. 19 shows the results for the flow calculations on the second embodiment of the vapor pressure management apparatus shown in FIG. 8.

FIG. 20 shows the results for the fluid particle force calculations on the second embodiment of the vapor pressure management apparatus shown in FIG. 8.

DETAILED DESCRIPTION OF THE PREFERRED EMBODIMENT

As it is used in this description, "atmosphere" generally refers to the gaseous envelope surrounding the Earth, and "atmospheric" generally refers to a characteristic of this envelope.

As it is used in this description, "pressure" is measured relative to the ambient atmospheric pressure. Thus, positive pressure refers to pressure greater than the ambient atmospheric pressure and negative pressure, or "vacuum," refers to pressure less than the ambient atmospheric pressure.

Also, as it is used in this description, "headspace" refers to the variable volume within an enclosure, e.g. a fuel tank, that is above the surface of a liquid, e.g., fuel, in the enclosure. In the case of a fuel tank for volatile fuels, e.g., gasoline, vapors from the volatile fuel may be present in the headspace of the fuel tank.

Figure 1:
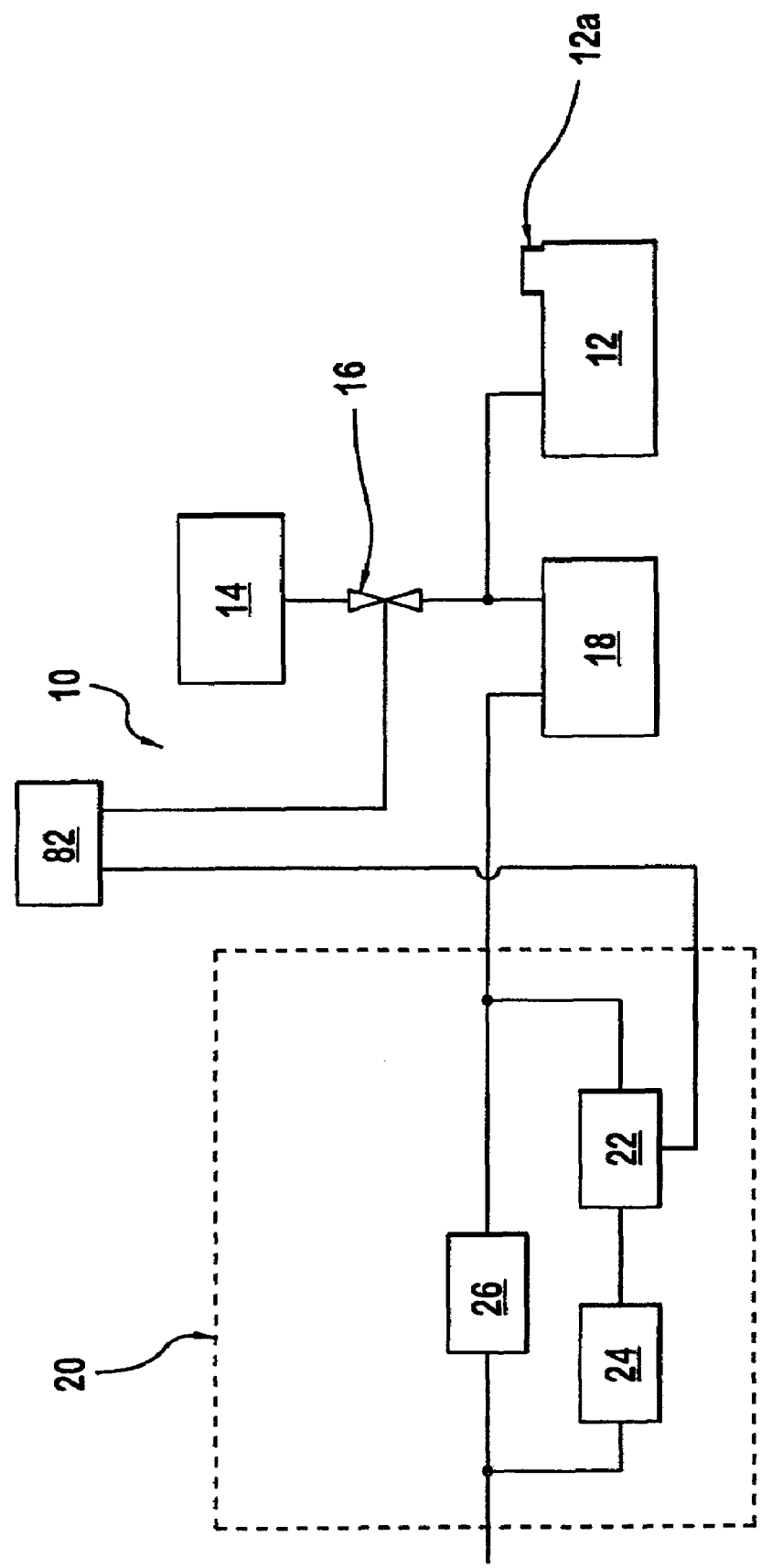
FIG. 1 is a schematic illustration of a fuel system that includes a fuel vapor pressure management apparatus in accordance with the detailed description of certain preferred embodiments.

Referring to FIG. 1, a fuel system 10, e.g., for an engine (not shown), includes a fuel tank 12, a vacuum source 14 such as an intake manifold of the engine, a purge valve 16, a fuel vapor collection canister 18 (e.g., a charcoal canister), and a fuel vapor pressure management apparatus 20.

The fuel vapor pressure management apparatus 20 performs a plurality of functions including signaling 22 that a first predetermined pressure (vacuum) level exists, "vacuum relief" or relieving negative pressure 24 at a value below the first predetermined pressure level, and "pressure blow-off" or relieving positive pressure 26 above a second pressure level.

Other functions are also possible. For example, the fuel vapor pressure management apparatus 20 can be used as a vacuum regulator, and in connection with the operation of the purge valve 16 and an algorithm, can perform large leak detection on the fuel system 10. Such large leak detection could be used to evaluate situations such as when a refueling cap 12a is not replaced on the fuel tank 12.

It is understood that volatile liquid fuels, e.g., gasoline, can evaporate under certain conditions, e.g., rising ambient temperature, thereby generating fuel vapor. In the course of cooling that is experienced by the fuel system 10, e.g., after the engine is turned off, a vacuum is naturally created by cooling the fuel vapor and air, such as in the headspace of the fuel tank 12 and in the fuel vapor collection canister 18. According to the present description, the existence of a vacuum at the first predetermined pressure level indicates that the integrity of the fuel system 10 is satisfactory. Thus, signaling 22 is used to indicate the integrity of the fuel system 10, i.e., that there are no appreciable leaks. Subsequently, the vacuum relief 24 at a pressure level below the first predetermined pressure level can protect the fuel tank 12, e.g., can prevent structural distortion as a result of stress caused by excess vacuum in the fuel system 10.

After the engine is turned off, the pressure blow-off 26 allows excess pressure due to fuel evaporation to be vented, and thereby expedite the onset of vacuum generation that subsequently occurs during cooling. The pressure blow-off 26 allows air within the fuel system 10 to be released while fuel vapor is retained. Similarly, in the course of refueling the fuel tank 12, the pressure blow-off 26 allows air to exit the fuel tank 12 at a high rate of flow.

At least two advantages are achieved in accordance with a system including the fuel vapor pressure management apparatus 20. First, a leak detection diagnostic can be performed on fuel tanks of all sizes, including large volume fuel tanks, e.g., 100 gallons or more. Second, the fuel vapor pressure management apparatus 20 is compatible with a number of different types of the purge valves, including digital and proportional purge valves.

Figure 2A:
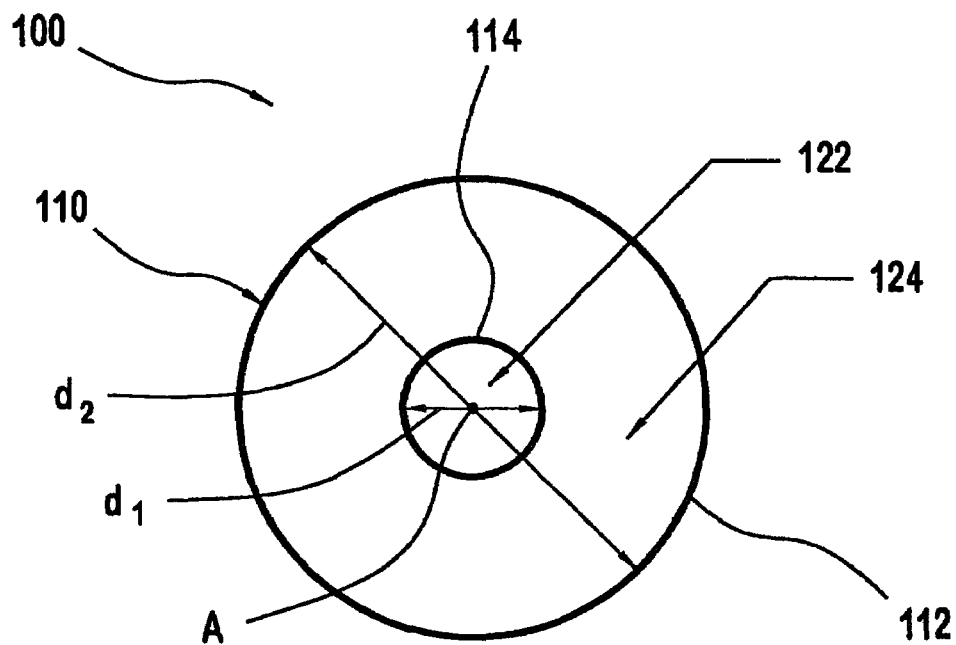
FIG. 2A is a top view of a model illustrating the operating principles of a vapor pressure management apparatus.
Figure 2B:
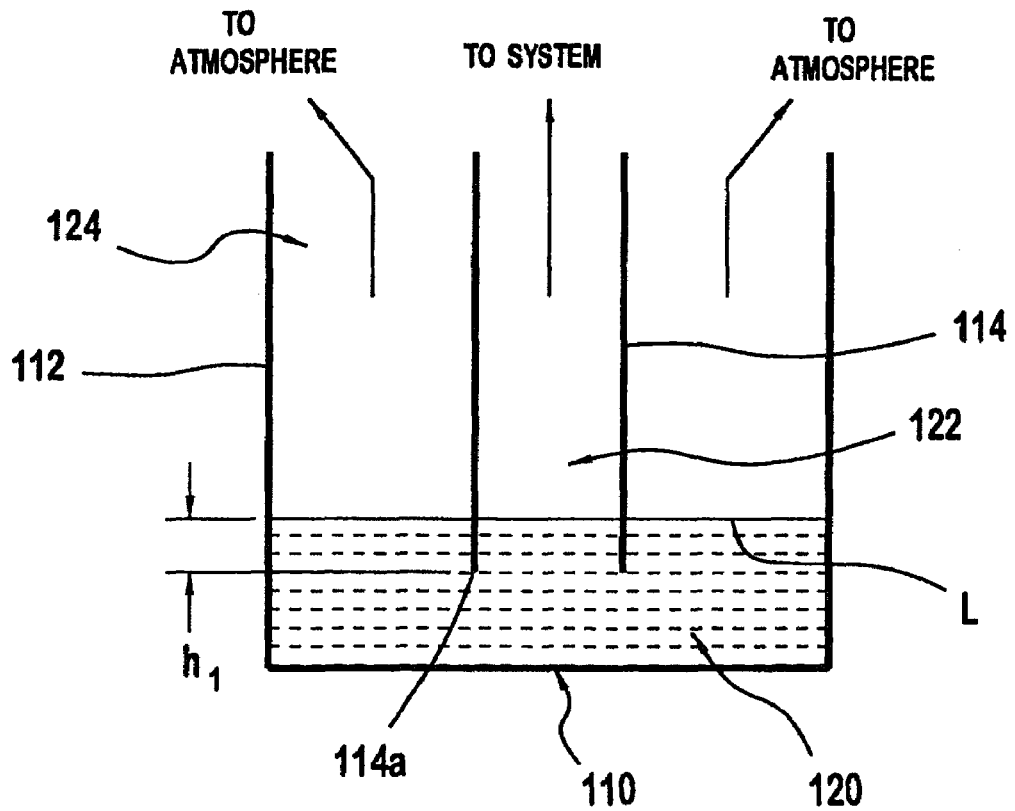
FIG. 2B is an elevation view showing the resting state of the model shown in FIG. 2A.

Referring to FIGS. 2A and 2B, a model 100 of the fuel vapor pressure management apparatus 20 will now be described. The model 100 relies on the principal of a standing column of liquid. Consider a cylindrical vessel 110 consisting of a container 112 with a freestanding cylindrical tube 114. The vessel 110 is partially filled with liquid 120 that separates the vessel 110 into a first chamber 122 and a second chamber 124. The first chamber is defined within the cylindrical tube 114, and the second chamber 124 is defined between the wall of the container 112 and the cylindrical tube 114. As shown in FIG. 2A, the first chamber 122 is circular and the second chamber 124 is annular. The shapes of the chambers 122,124 in the model 100 may alternatively be defined by irregular or regular shapes other than circles, and may or may not share a common central axis A. The operation of this model will now be described.

FIG. 2B shows a resting state of the model 100. In the resting state, the liquid 120 is at a level L, with respect to the bottom of the vessel 110, that is the same in both the first and second chambers 122,124. According to the model 100 shown in FIGS. 2A and 2B, the cylindrical tube 114 has an inside diameter d1 and the container 112 has an inside diameter d2. The vessel 110 is filled with the liquid 120 so that the cylindrical tube 114 is immersed to a depth of h1. The volume of liquid below the cylindrical tube 114 does not change the operation of the device. In the resting state, the model 100 will not allow fluid, e.g., air, to pass between the first and second chambers 122,124. In effect, the liquid 120 contiguously engaging the bottom end 114a of the cylindrical tube 114 creates a sufficient seal to prevent free transfer of fluid between the first and second chambers 122,124. Flow will only occur through the model 100, i.e., between the first and second chambers 122,124, when a pressure or vacuum threshold is achieved as explained below.

Figure 3:
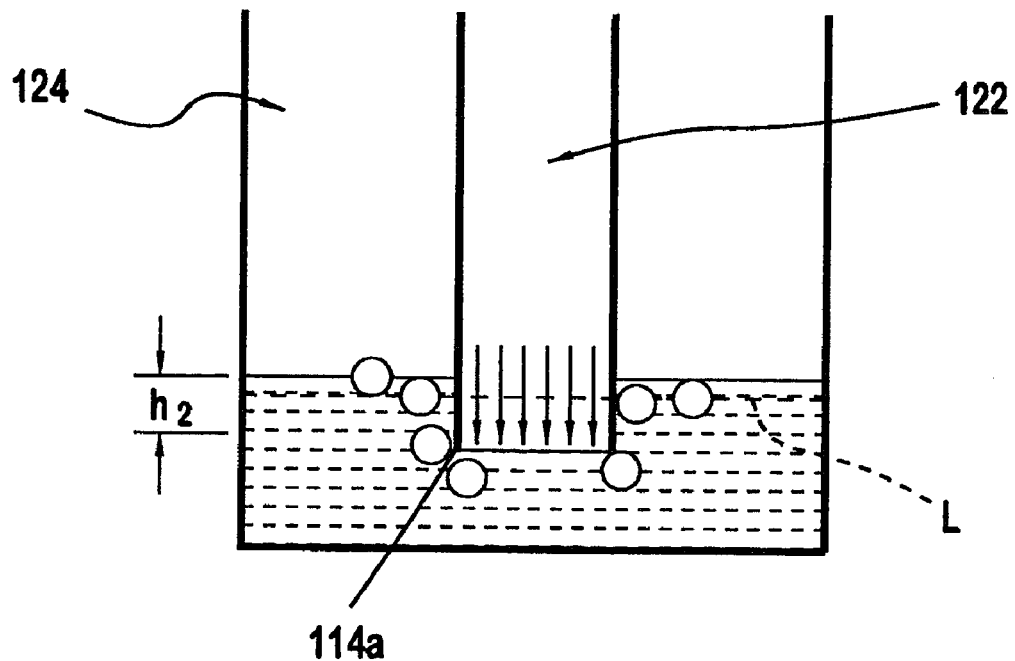
FIG. 3 is an elevation view showing a first operating state of the model shown in FIG. 2A.

Referring now to FIG. 3, the pressure relief mode of the model 100 is enabled, when a positive pressure differential exists in the first chamber 122 relative to the second chamber 124. If a system to which the model 100 is connected, e.g., the fuel system 10, applies pressure to the first chamber 122, the column of liquid 120 within the cylindrical tube 114 is displaced until fluid escapes under the bottom end 114a into the second chamber 124. As positive pressure increases, the liquid 120 will be displaced from the cylindrical tube 114 into the annular volume of between the container 112 and the cylindrical tube 114. The start to flow pressure is governed by the head, h2. The volume of the liquid 120 inside the cylindrical tube 114 in the resting state can be calculated as:

$$h_1 \times \pi (d_1/2)^2 \text{ or } h_1 \times A_1$$

where $A_1$ is the cross-sectional area inside the cylindrical tube 114. When the positive pressure differential reaches a level where the entire volume of the liquid 120 inside the cylindrical tube 114 has been displaced, fluid in the form of bubbles, as depicted in FIG. 3, will begin to escape from the first chamber 122. The level at which this pressure relief flow will begin to occur can be calculated by:

$$h_2 = h_1 + ((h_1 \times A_1)/A_2)$$

The pressure differential h2 at which pressure relief occurs is dependent on the specific gravity of the liquid. As can be seen by this formula, the pressure relief point h2 can be made significantly lower by increasing the difference in area between A1 and A2.

Figure 4:
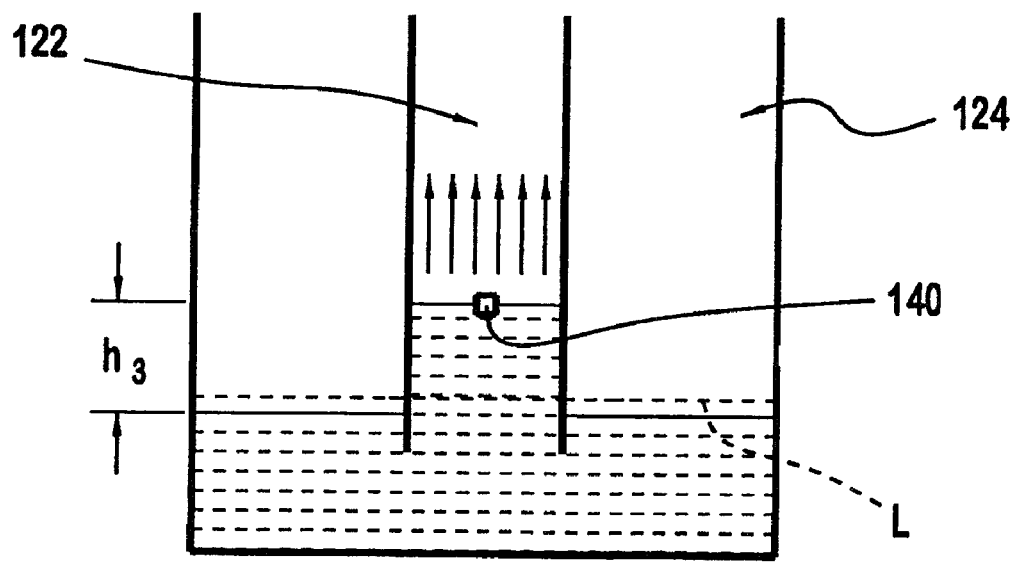
FIG. 4 is an elevation view showing a second operating state of the model shown in FIG. 2A.

Vacuum sensing is depicted in FIG. 4. An appropriate liquid level sensor 140 has been placed approximate halfway up the cylindrical tube 114. The level sensor 140 is active when the vehicle engine is OFF. If the system to which the model 100 is connected, e.g., the fuel system 10, applies vacuum to the first chamber 122, the column of liquid 120 within the cylindrical tube 114 is raised. The column of the liquid 120 can be detected by a number of methods (float, thermistor, capacitive, conductive, optical, etc.) when the liquid head reaches the detection threshold, h3. The sensor 140 will signal a passing diagnostic when a negative pressure differential that exists in the first chamber 122 relative to the second chamber 124 draws the liquid 120 up to the point of touching or triggering the level sensor 140. The vacuum sensing level or calibration is related to head differential between the first and second chambers 122,124, and to the specific gravity of the liquid 120. For example, at a given position of the level sensor 140, the vacuum sense calibration will increase with increasing specific gravity.

Figure 5:
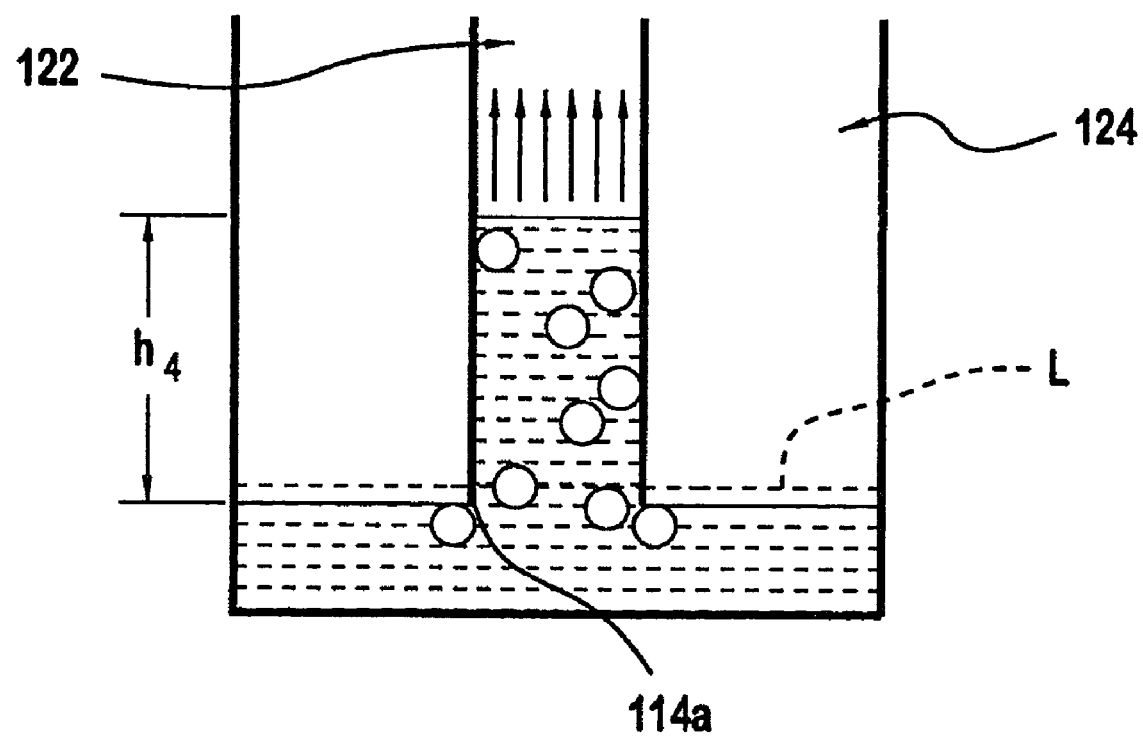
FIG. 5 is an elevation view showing a third operating state of the model shown in FIG. 2A.

Vacuum relief is depicted in FIG. 5. As vacuum continues to raise the column of the liquid 120 in the first chamber 120 to a higher level than in FIG. 4, the liquid 120 will be displaced from the second chamber 124, under the bottom end 114a of the cylindrical tube 114, and into the first chamber 122. When the negative pressure differential reaches a level where the entire volume of the liquid 120 outside the cylindrical tube 114 has been displaced, i.e., to the bottom 114a of the cylindrical tube 114, fluid in the form of bubbles, as depicted in FIG. 5, will begin to escape from the second chamber 124, under the bottom end 114a of the cylindrical tube 114, and into the first chamber 122. The level at which this vacuum relief flow will begin to occur can be calculate by:

$$h_4 = h_1 + ((h_1 \times A_2)/A_1)$$

Figure 6:
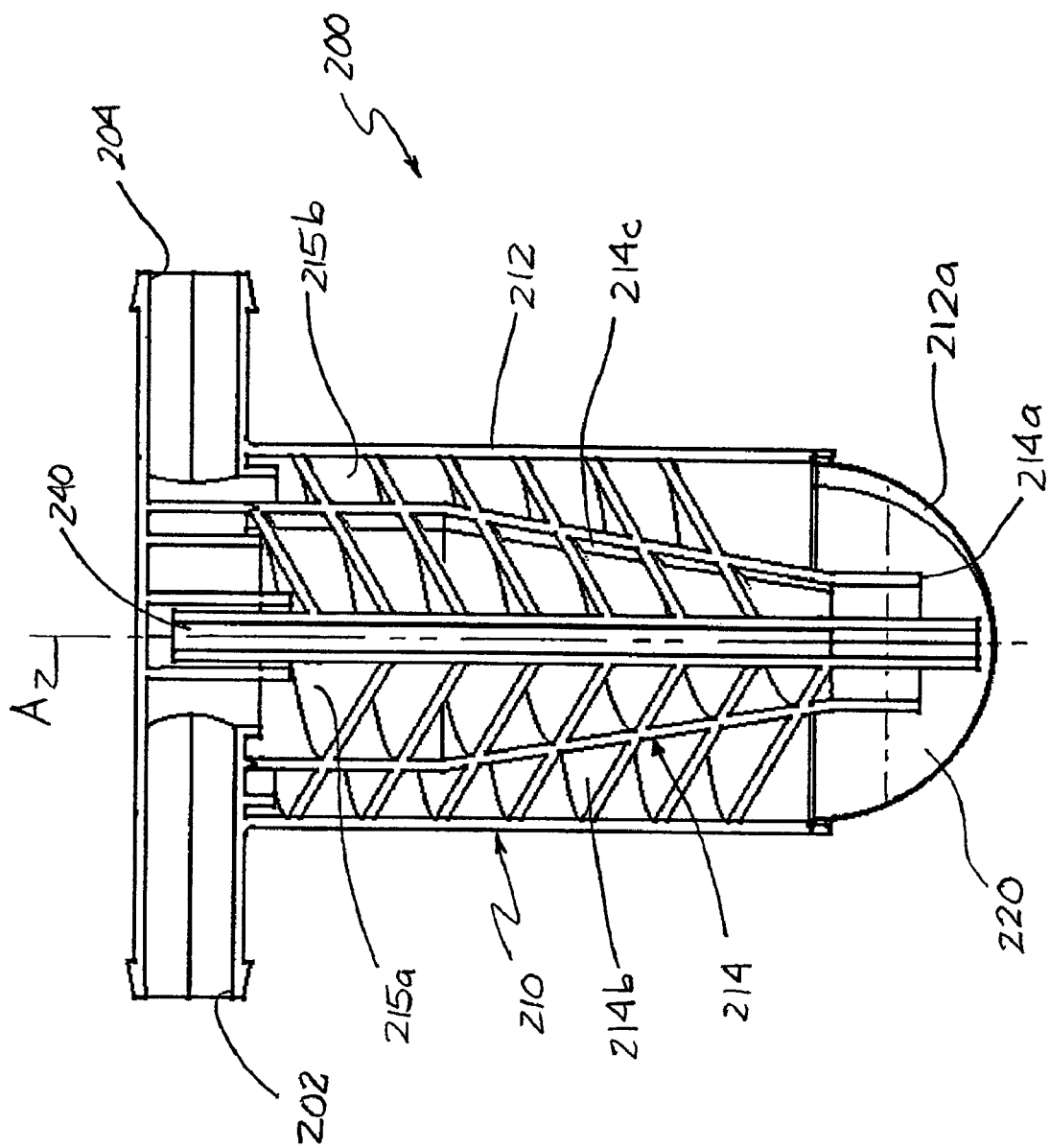
FIG. 6 is a cross-section of a first preferred embodiment of a vapor pressure management apparatus.
Figure 7A:
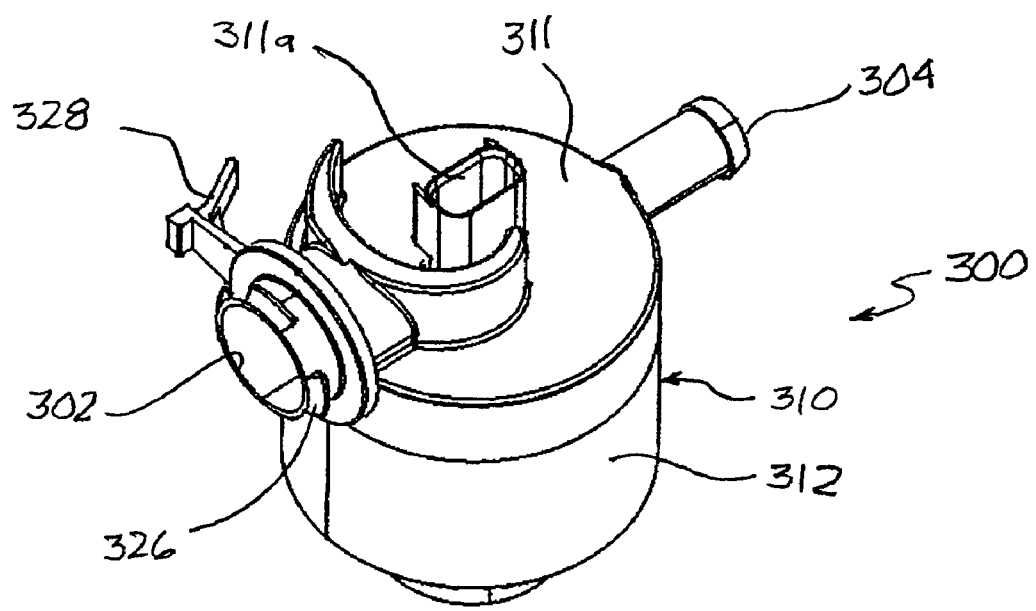
FIGS. 7A and 7B are isometric views of a second preferred embodiment of a vapor pressure management apparatus.
Figure 7B:
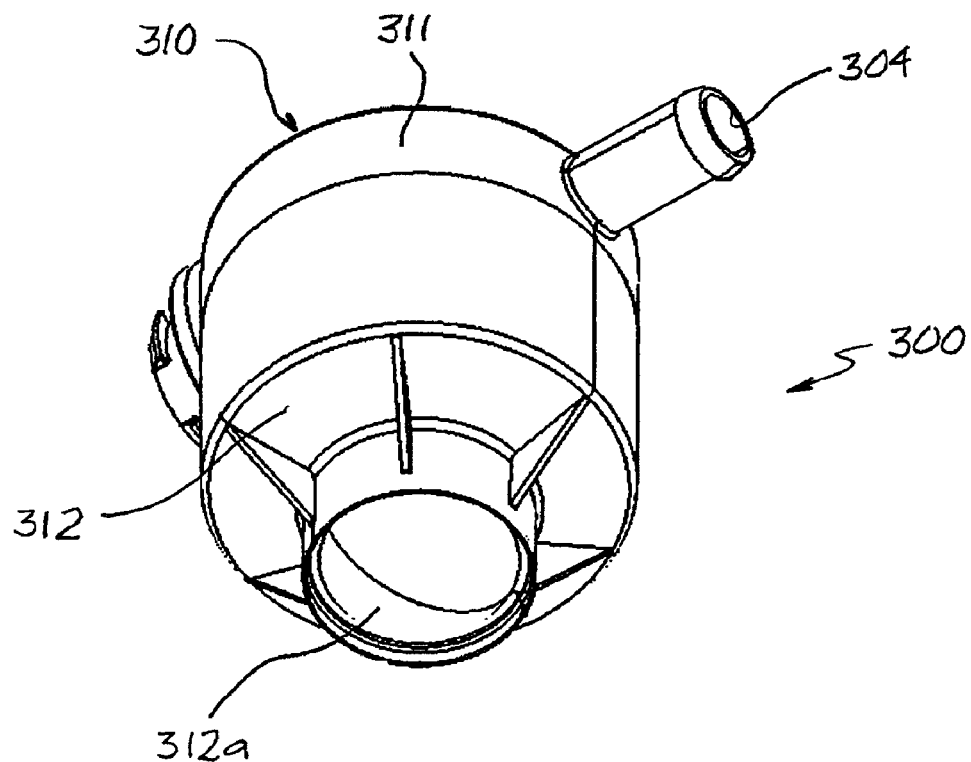
Figure 8:
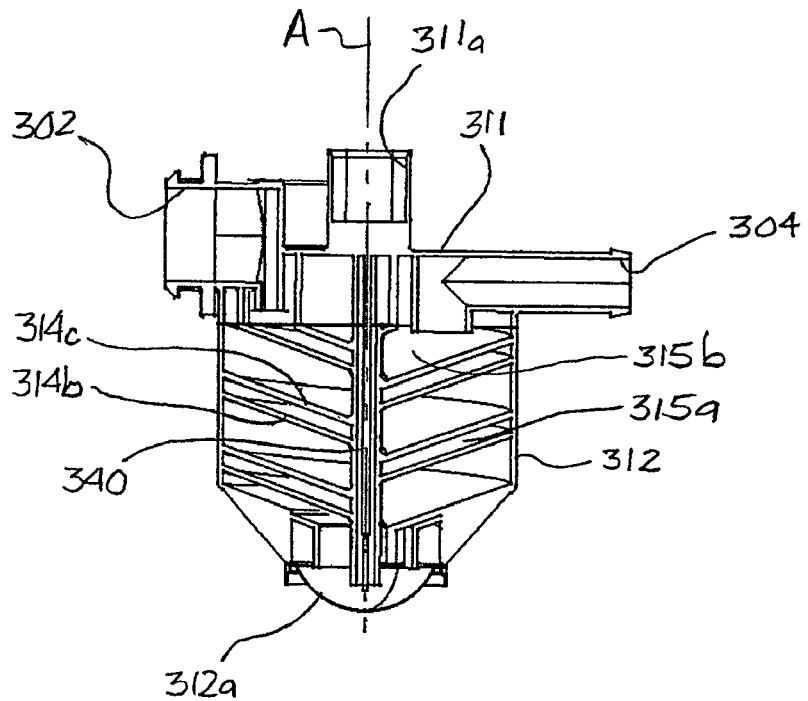
FIG. 8 is a cross-section of the second embodiment of the vapor pressure management apparatus shown in FIGS. 7A and 7B.
Figure 9:
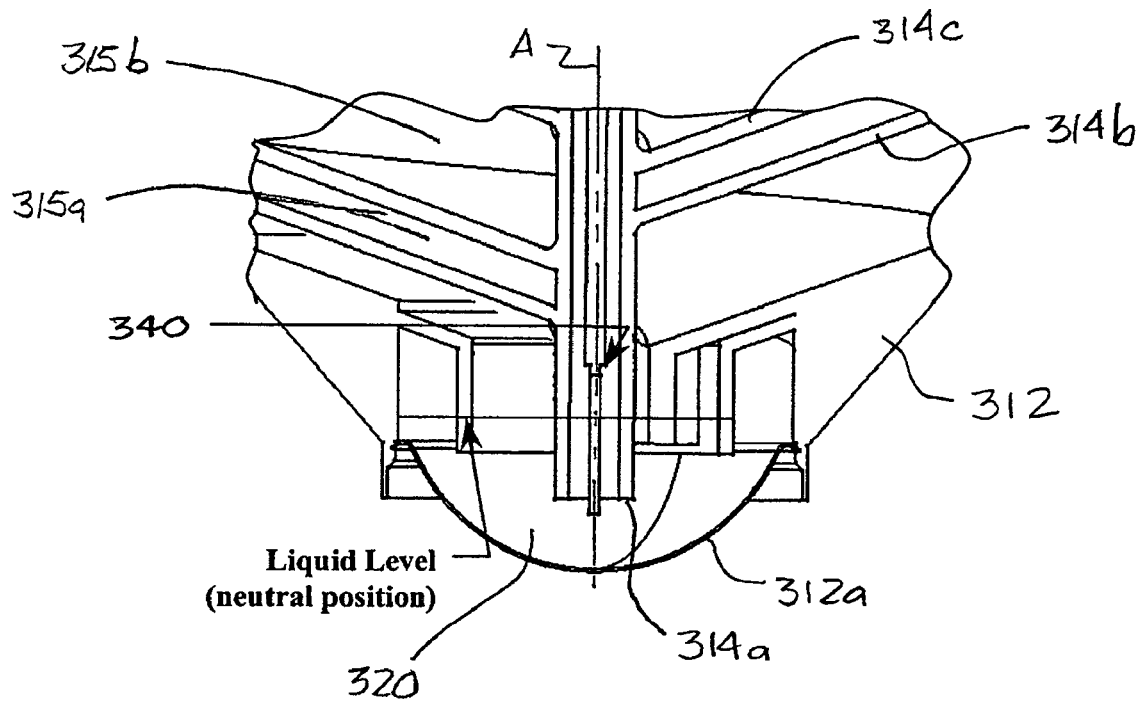
FIG. 9 is a detail view of the cross-section of the second embodiment of the vapor pressure management apparatus shown in FIG. 8.
Figure 10:
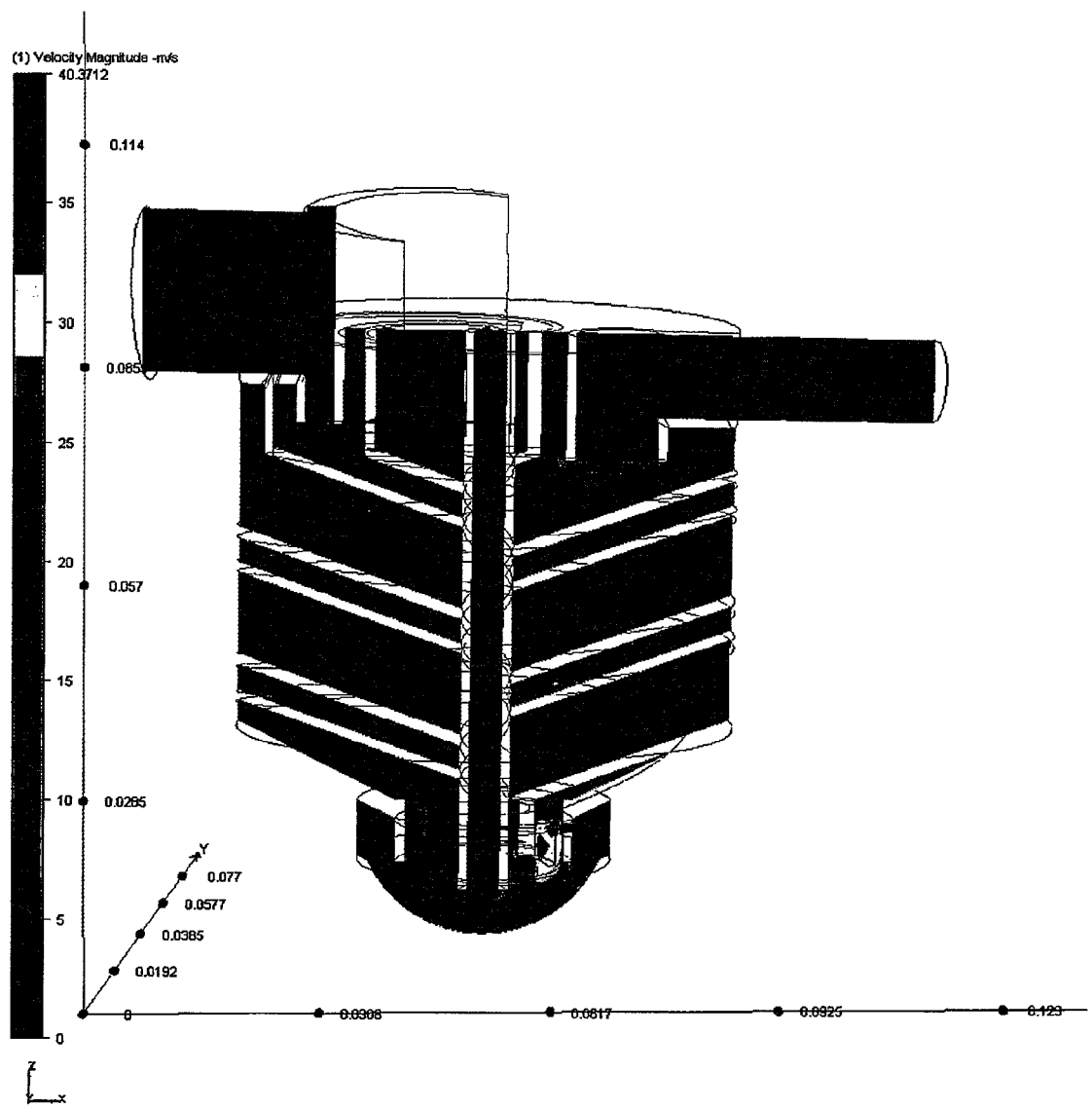
FIG. 10 illustrates velocity contours within the second embodiment of the vapor pressure management apparatus shown in FIG. 8 at a pressure level of +9 inches of water applied during pressure blow-off.
Figure 11:
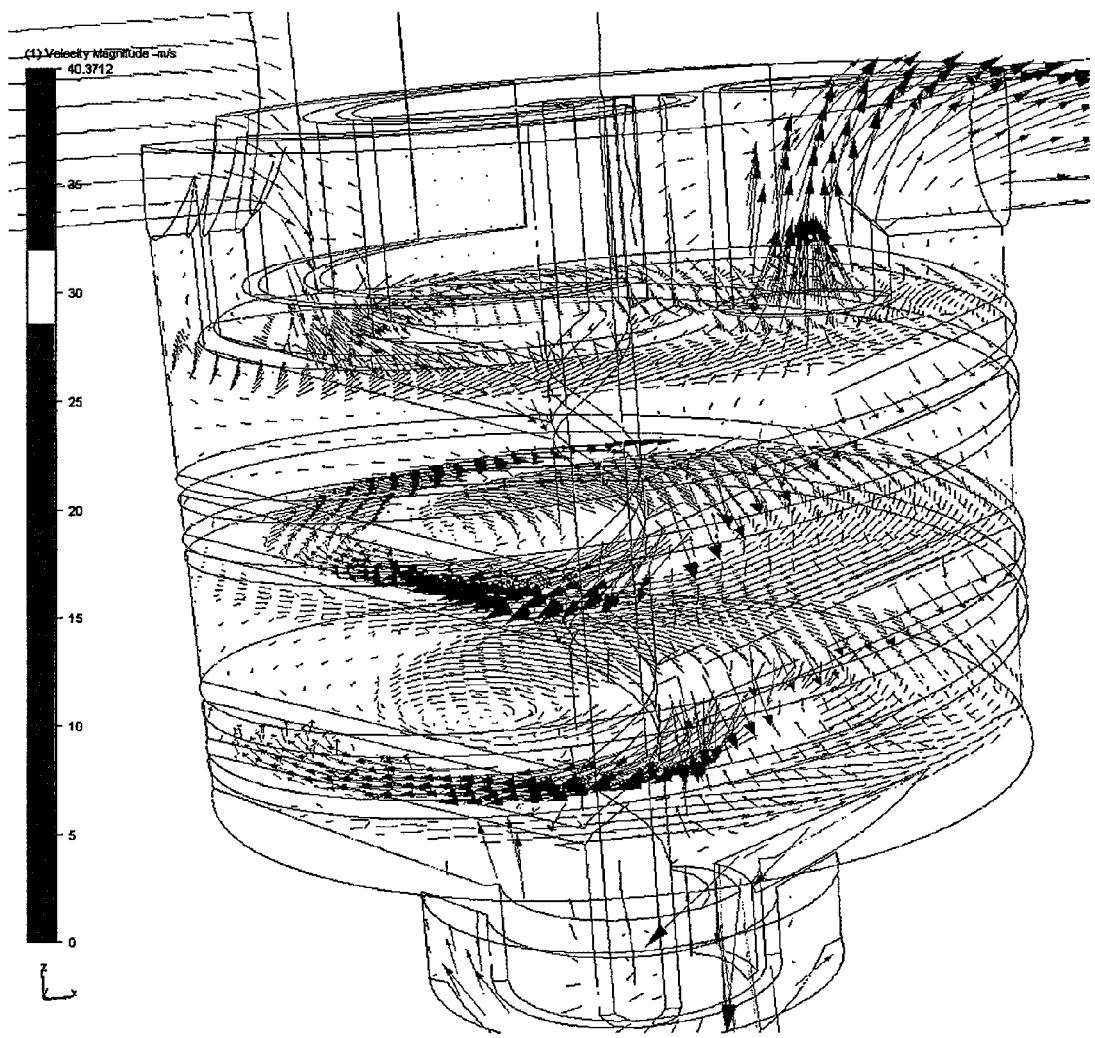
FIG. 11 illustrates velocity vector distribution within the second embodiment of the vapor pressure management apparatus shown in FIG. 8 at a pressure level of +9 inches of water applied during pressure blow-off.
Figure 12:
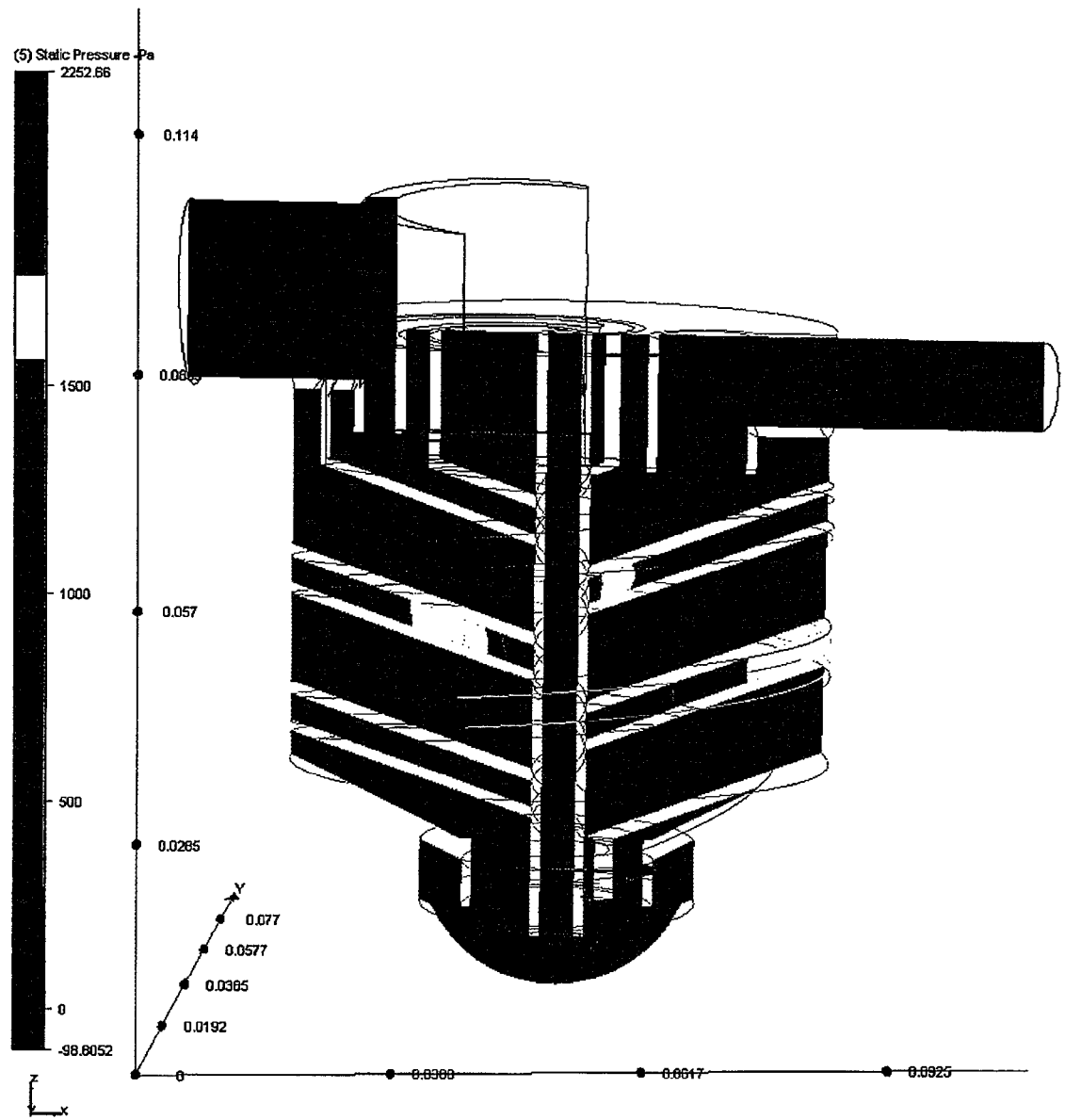
FIG. 12 illustrates pressure contours within the second embodiment of the vapor pressure management apparatus shown in FIG. 8 at a pressure level of +9 inches of water applied during pressure blow-off.

FIG. 6 schematically illustrates a first preferred embodiment of a vapor pressure management apparatus 200. Features having characteristics and functions that are similar to those of the model 100 are indicated with reference numerals that are incremented by one hundred. Thus, for example, sensor 240 of the vapor pressure management apparatus 200 has characteristics and functions that are similar to sensor 140 of the model 100. FIG. 6 also illustrates several additional features that will now be described.

The apparatus 200 includes a cylindrical vessel 210 that defines a flow path between an inlet 202, which is preferably in fluid communication with the fuel system 10, and an outlet 204, which is preferably in fluid communication with the atmosphere. The cylindrical vessel 210 is preferably constructed of only components including a container 212, a baffle 214 and a semi-spherical portion 212a connected to the container 212, which contains a volume of a liquid 220. The semi-spherical portion 212a as shown in FIG. 6 is detachable with respect to the container 212 so as to facilitate insertion of the baffle 214 in the container 212. However, the semi-spherical portion 212a may alternatively be integrally formed with the container 212, and the container 212 provided with an alternate arrangement for inserting the baffle 214, e.g., a cap portion including the inlet 202 and outlet 204 may be detachable with respect to the container 212.

The baffle 214 extends between a first end that is proximate the inlet 202 and outlet 204, and a second end 214a that is proximate the semi-spherical portion 212a of the container 212. The second end 214a of the baffle 214 contiguously engages the liquid 220.

So as to minimize or eliminate loss of the liquid 220 due to entrainment in the passing air fluid, the baffle 214 includes a first panel 214b and a second panel 214c. The first panel 214b extends helically about a longitudinal axis A between the first end and the second end 214a of the baffle 214. The second panel 214c includes a cylinder that is disposed about the longitudinal axis A and extends between the first end and the second end 214a. The second panel 214c of the baffle 214 intersects the first panel 214b of the baffle 214 so as to separate the helical flow path into a first part 215a and a second part 215b.

The first part 215a of the helical flow path is in fluid communication with the inlet port 202, and the second part 215b of the helical flow path is in fluid communication with the outlet port 204. Preferably, the first part 215a of the helical flow path is radially proximate to the longitudinal axis A and the second part 215b of the helical flow path is radially distal to the longitudinal axis A. Accordingly, the second part 215b of the helical flow path preferably circumscribes the first part 215a of the helical flow path.

The second panel 214c preferably tapers between the first end of the baffle 214 and the second end 214a of the baffle 214. Of course different configurations of the second panel 214c are possible, including various cross-sections perpendicular to the longitudinal axis A, different tapers or no tapers, and being disposed other than symmetrically about the longitudinal axis A.

Additionally, the vessel 210 encloses the liquid 220 so as to contain the liquid 220 regardless of the orientation of the vapor pressure management apparatus 200. The liquid provides a means for controlling the direction of fluid flow, without a resilient element and without an electric element.

Referring now to FIGS. 7A, 7B, 8 and 9, there is shown a fuel vapor pressure management apparatus 300 according to a second preferred embodiment. Again, features having characteristics and functions that are similar to those of the model 100 or the first preferred embodiment of the vapor pressure management apparatus 200 are indicated with reference numerals that are incremented by two-hundred and one-hundred, respectively. Thus, for example, sensor 340 of the fuel vapor pressure management apparatus 300 has characteristics and functions that are similar to sensor 140 of the model 100, and to sensor 240 of the vapor pressure management apparatus 200. FIGS. 7A, 7B, 8 and 9 also illustrates several additional features that will now be described.

The fuel vapor pressure management apparatus 300 includes a container 310 that preferably includes three components: a Nylon cap portion 311 with at least one insert molded terminal 311a, a Nylon body container portion 312, and a stamped steel cup portion 312a.

Similar to the fuel vapor pressure management apparatus 200, the fuel vapor pressure management apparatus 300 also includes first and second panels 314b and 314c. However, both the first and second panels 314b,314c extend helically about the longitudinal axis A between the first end and the second end 314a of the baffle 314. The first panel 314b is offset along the longitudinal axis A from the second panel 314c so as to define therebetween the first and second parts 315a,315b of the helical flow path. As such, the first and second parts 315a,315b of the helical flow path define a double helix configuration that circumscribes the longitudinal axis A.

In fuel vapor pressure management apparatuses 200,300, the baffles 214,314 extend radially between inner and outer ends. Preferably, the inner ends of the baffles 214,314 are displaced axially toward the semi-spherical portions 212a, 312a of the housings 212,312 relative to the outer end of the baffle 314,214. As such, the helical panels 214b,314b,314c extend obliquely with respect to the longitudinal axis A, e.g., forming cone shaped surfaces.

Inlet port 302 may include a fitting that is particularly suited to being mounted on the fuel vapor collection canister 18 of the fuel system 10 (FIG. 1). The fuel vapor pressure management apparatus 300 includes a container 312 that can be mounted directly to the fuel vapor collection canister 18 by a "bayonet" style attachment 326. A seal (not shown) can be interposed between the fuel vapor collection canister 18 and the fuel vapor pressure management apparatus 300 so as to provide a fluid tight connection. The bayonet style attachment 326, in combination with a snap finger 328, allows the fuel vapor pressure management apparatus 300 to be readily serviced in the field. Of course, different styles of attachments between the fuel vapor pressure management apparatus 300 and the fuel vapor collection canister 18 can be substituted for the illustrated bayonet attachment 326. Examples of different attachments include a threaded attachment, and an interlocking telescopic attachment. Alternatively, the fuel vapor collection canister 18 and the container 312 can be bonded together (e.g., using an adhesive).

A semi-spherical portion 312a of container 312 contains the liquid 320 in the resting state of the fuel vapor pressure management apparatus 300. The inventors of the present invention have discovered that the semi-spherical shaped portion 312a reduces the impact of tilting from the vertical on the calibration of the fuel vapor pressure management apparatus 300.

The baffles 214,314 provide the preferred embodiment that minimizes or eliminates liquid entrainment in the fluid flow. As an alternative to the helical fluid flow paths defined by the baffles 214,314 of the fuel vapor pressure management apparatuses 200,300, a series of concentric walls could be used to minimize or eliminate liquid entrainment in the fluid flow so long as the configuration of the walls develops sufficient variations in the velocity contours, velocity vector distribution, or pressure contours. Moreover, any set of partitions or walls may be configured to define a tortuous flow path through the housing so long as the configuration of the walls develops sufficient variations in the velocity contours, velocity vector distribution, or pressure contours. The means for controlling entrainment of the liquid into the flow of the fluid along the flow path may be any of the above alternatives or their equivalents.

With regard to the liquid 120,220,320, increasing the specific gravity of the liquid will reduce the physical size of the device. For example, increasing the specific gravity of the liquid reduces the displacement (i.e., h4 in the case of vacuum relief) of the liquid column necessary to achieve the same vacuum level at the point of relief.

Ideally, the viscosity of the liquid 120,220,320 would be heavy enough that the bursting bubbles do not spray liquid into the air stream to be carried away. In practice, however, the inventors have discovered that liquid traps used to capture and retain the liquid 120,220,320 so as not to drain out of the container 112,212,312 if the vessel 110,210,310 is tilted or overturned do not satisfactorily capture entrained liquid as a result of bubbles bursting. Hence, the baffles 214,314 are installed to direct the flow of the liquid 220,320 away from the ports and to provide a tortuous path that keeps the liquid 220,320 inside the vapor pressure management apparatus. Preferably, the viscosity remains fluid enough to enable the apparatus to operate at extreme low temperatures.

For the device to be viable over the life of a vehicle, the liquid needs have a very low evaporation rate and must not freeze into a solid until at least −40° Celsius. According to the preferred embodiments, a liquid should possess the following properties:

Excellent oxidative and thermal stability
Low volatility and vapor pressure
Non-flammable and chemically inert
Excellent plastic and elastomer compatibility
Resistant to aggressive chemicals and solvents Low evaporation is required so that that apparatus function can be maintained over a 15-year and 150,000-mile life of a vehicle. In addition, a low evaporation rate ensures that the liquid itself will not create stray airborne hydrocarbon molecules that could fail an evaporative emissions test. A preferable liquid will have a kinematic viscosity range of 75-600 centistokes throughout a temperature range of −40 to +100 degrees Celsius, and will have a near zero vapor pressure (~$5 \times 10^{-9}$ torr at 100 degrees Celsius).

A synthetic oil, such as Fluorinated Polyether, is an example of an acceptable liquid. Preferably, the liquid may be Perfluoropolyether (PFPE), which has an acceptable viscosity and may be used in extreme temperature environments or in applications that require chemical, fuel, or solvent resistance.

The liquid 120,220,320 may also include, in suspension in the liquid 120,220,320, an additive that acts as an electrical conductor. According to preferred embodiments, the liquid 120,220,320 may include carbon particles, copper or a chemical additive, e.g., sodium chloride, i.e., salt. It is relatively inexpensive to provide carbon particles suspended in the liquid 120,220,320, but this increases the viscosity of the liquid 120,220,320 and presents a high electrical resistance. Suspending copper in the liquid 120,220,320 provides a relatively low electrical resistance conductor, but may settle out of the liquid 120,220,320 and could be corrosive. Chemical additives provide a stable solution without adversely affecting viscosity of the liquid 120,220,320 but, like the carbon particles, may present a high electrical resistance.

Alternatively or additionally, the liquid 120,220,320 may include glass micro-spheres to thicken the liquid and prevent splashing and liquid carry-over. The liquid may also be a gel.

With regard to the sensor 140,240,340, the vacuum sensing 22 can be accomplished with a positive or negative temperature coefficient thermistor, a capacitive sensor, a float and a contact switch, a magnet and a reed switch, resistive/conductive oil, and many others. These devices can be used to sense the liquid level of the column in the first chamber. For example, the presence or absence of the liquid at a level can be sensed using a heated thermistor that dissipates more heat in liquid than in air, or with a capacitive sensor inasmuch as oil and air have very different dielectric constants. Further, sensors that measure that directly measure the pressure differential that causes liquid displacement can also be used in conjunction with the vacuum relief and pressure blow-off the pressure differentials between the first and second chambers.

The performance of the fuel vapor pressure management apparatus 300 will now be discussed with additional reference to FIGS. 10-20.

Figure 13:
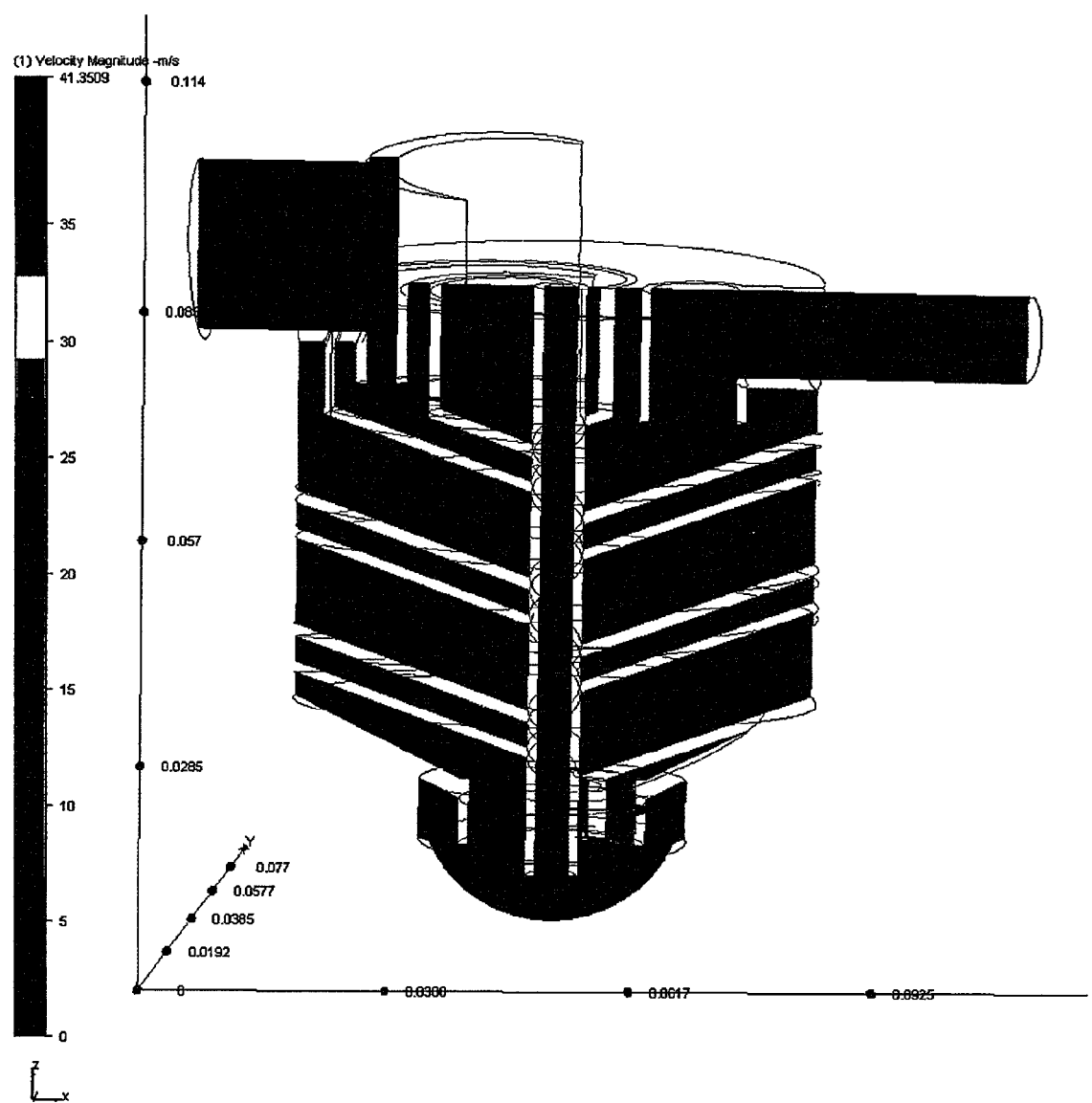
FIG. 13 illustrates velocity contours within the second embodiment of the vapor pressure management apparatus shown in FIG. 8 at a pressure level of −4 inches of water applied during pressure vacuum relief.
Figure 14:
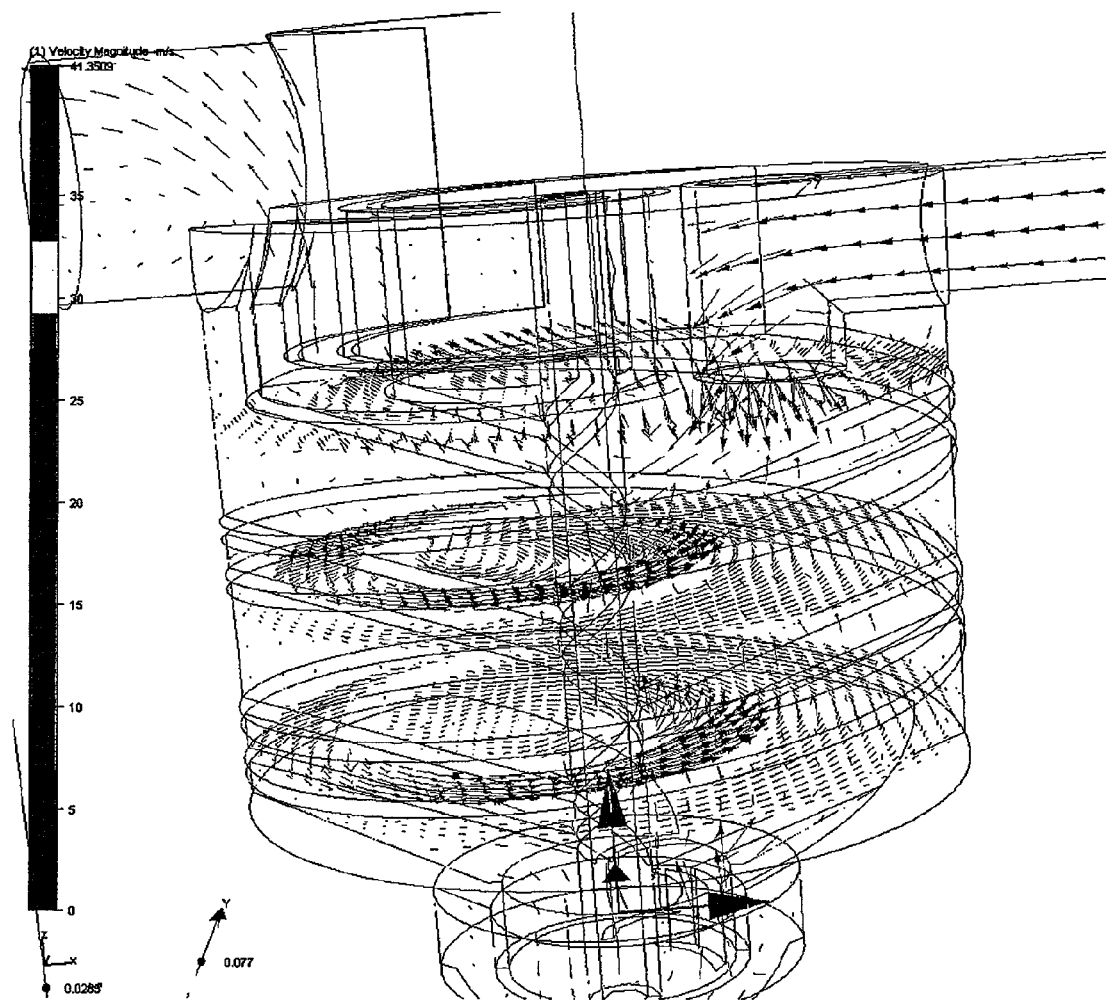
FIG. 14 illustrates velocity vector distribution within the second embodiment of the vapor pressure management apparatus shown in FIG. 8 at a pressure level of −4 inches of water applied during pressure vacuum relief.
Figure 15:
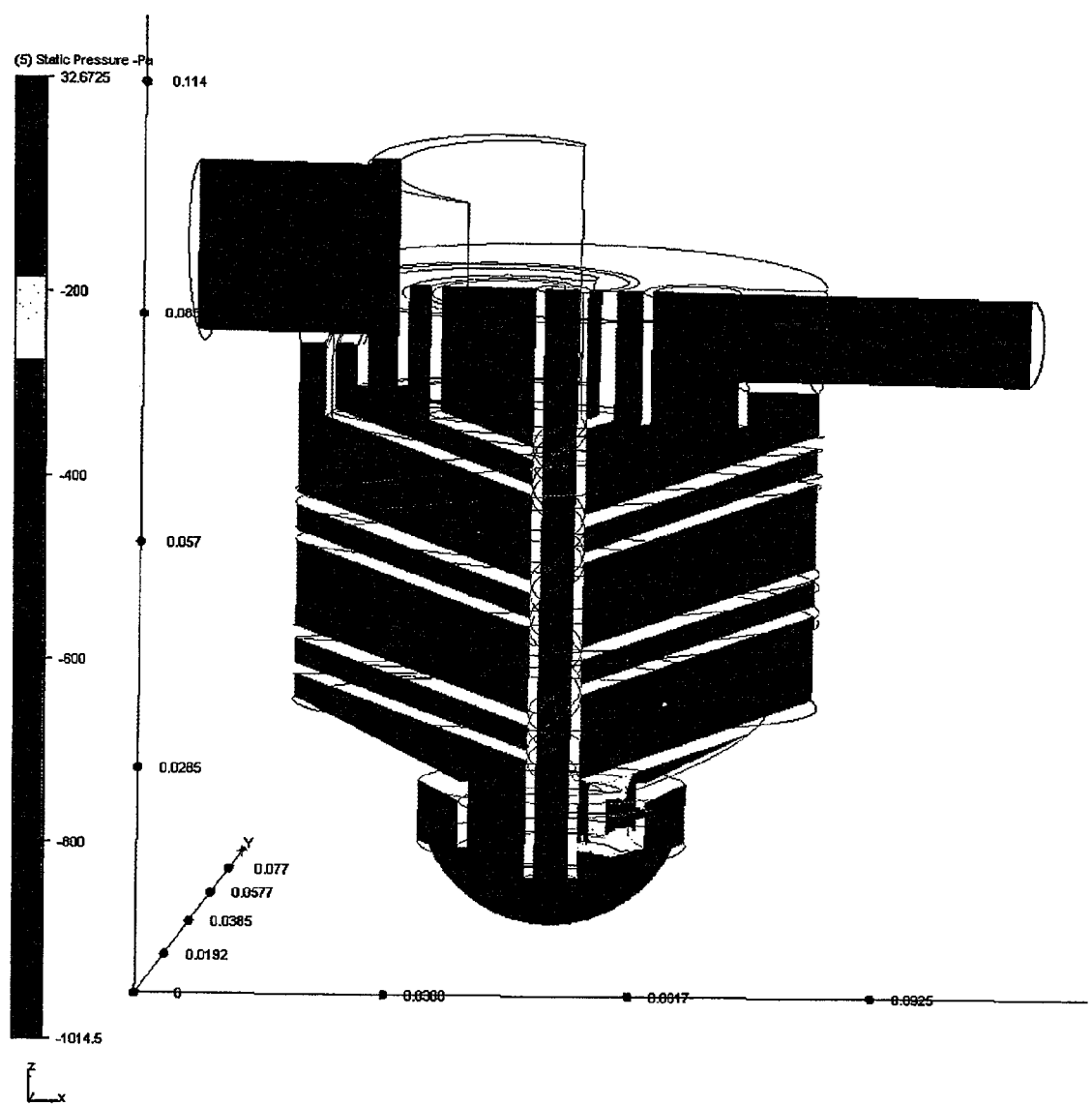
FIG. 15 illustrates pressure contours within the second embodiment of the vapor pressure management apparatus shown in FIG. 8 at a pressure level of −4 inches of water applied during pressure vacuum relief.

FIGS. 10 to 15 show the velocity contours (FIGS. 10 and 13), velocity vectors (FIGS. 11 and 14) and pressure contours (FIGS. 12 and 15) for the flow through the fuel vapor pressure management apparatus 300 during pressure blow-off 26 (FIGS. 10-12) and vacuum relief 24 (FIGS. 13-15).

Figure 16:
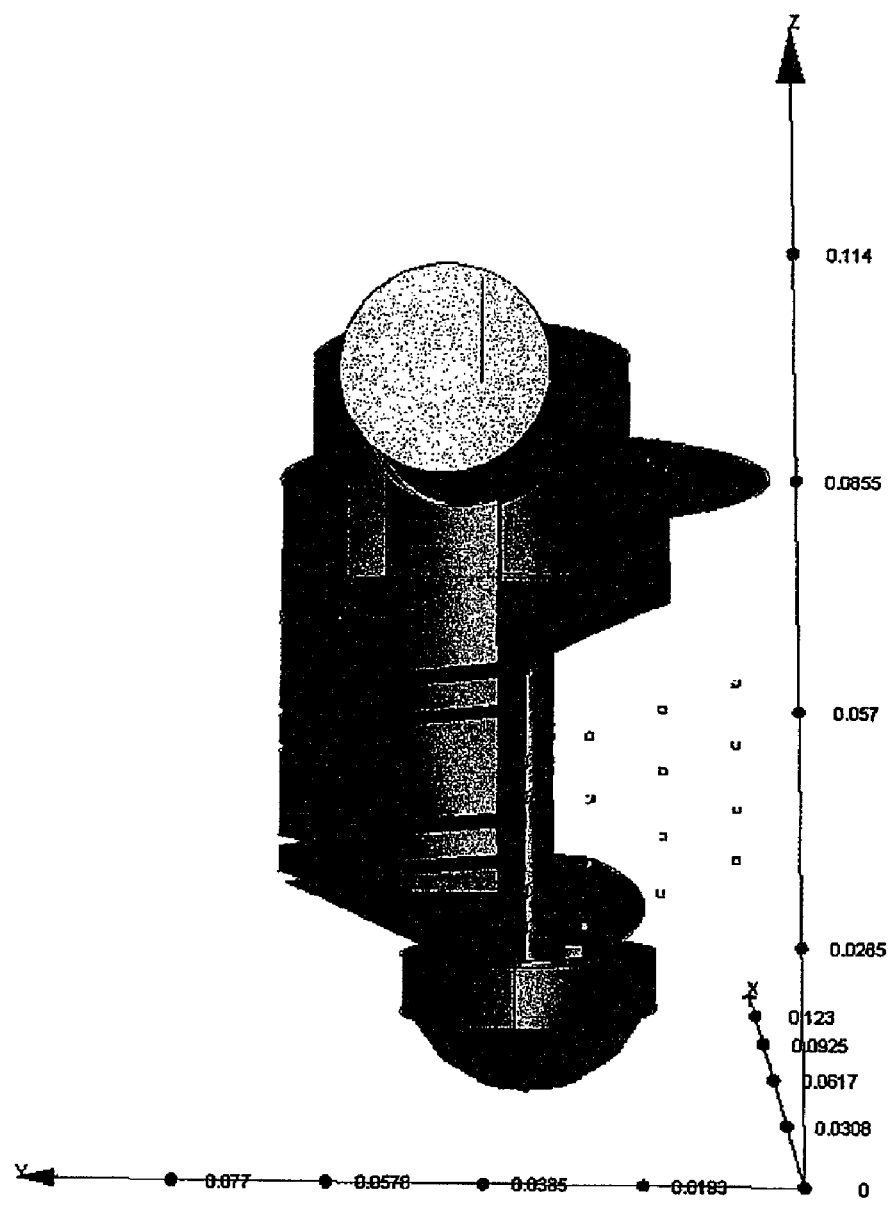
FIG. 16 illustrates an exemplary distribution of fluid particles within the second embodiment of the vapor pressure management apparatus shown in FIG. 8.

Referring also to FIG. 16, a fluid particle force analysis was conducted with twelve fluid particles inserted into the flow steam. The particle size was a 1 mm×1 mm×1 mm cube. The fluid particles were inserted according to the distribution shown in FIG. 16. The particles were numbered radially outward by each diagonal row. Row 1 (the lowermost row) contains particles 1-3, row 2 contains particles 4-6, row three contains particles 7-9, and row 4 (the top row) contains particles 10-12.

FIGS. 17 and 18 show the forces acting on particles placed in the flow stream according to FIG. 16 so as to determine the direction and magnitude of fluid forces acting on these particles. FIGS. 17 and 18 show the forces acting on the fluid particles in both pressure and vacuum modes respectively. Forces were only extracted for fluid particles in the upward stream flow velocity since this is the only case when the liquid particles will be present.

The flow results in FIG. 19 are given in both mass flow units and in standardized volumetric flow in standard liters per minute (SLPM). For the fluid particle wall forces in FIG. 20, the y-direction is positive towards the center of the part, the x-direction is positive into the page, and the z-direction is positive upward.

From examination of the plots of particle forces above it is seen that the axial and the circumferential fluid (Z and X respectively) acting on the fluid particle are much greater than the radial forces (Y). What this would indicate is that the particles would tend to be carried with the flow stream. It is also seen that the magnitude and direction of the force changes considerably with particle placement and with flow direction. By examining the radial forces between the two models it is seen that in pressure mode (FIGS. 10-12) the radial forces tend to propel the particles towards the center of the fuel vapor pressure management apparatus 300. However in vacuum mode (FIGS. 13-15), the forces tend to propel the particles outward.

Numerous advantages are achieved in accordance with the vapor pressure management apparatus according to the present invention. These advantages include providing a leak detection diagnostic using vacuum monitoring during natural cooling, e.g., after the engine is turned off, providing relief for vacuum below the first predetermined pressure level, and providing relief for positive pressure above the second predetermined pressure level. Additionally, the vacuum relief 24 provides fail-safe purging of the canister 18, and the relieving pressure 26 regulates the pressure in the fuel tank 12 during any situation in which the engine is turned off, thereby limiting the amount of positive pressure in the fuel tank 12 and allowing the cool-down vacuum effect to occur sooner.

According to the present invention, the liquid 120,220,320 has the ability to wet-out on the walls and effectively lower the volume that has to be displaced, and to lower the backpressure because the liquid clings to the walls and out of the path of airflow. The liquid 120,220,320 also acts as a wet filter to remove debris from the incoming air stream.

The present invention advantageously includes a semi-spherical shaped lower housing that reduces the impact of tilt angle on calibration. A spill-proof housing uses tortuous paths, preferably a helical flow path, and reservoirs to contain liquid in the event that the part is inverted, and then the liquid returns to its original location when part is set upright. Further, a reservoir of unused liquid can be provided to top up the liquid level if there is a liquid loss due to evaporation or liquid carry-over. And if liquid becomes contaminated or destroyed, a service procedure could be created to rejuvenate the part by extracting the used liquid and inject a replacement amount of new liquid.

It is also possible according to the present invention to take advantage of the meniscus effect on the cylindrical tube end. This will tend to create a higher than expected level of pressure or vacuum relief. Also, the meniscus effect can be used to make the device smaller than expected.

According to the present invention, installation options include in-line and canister mounted variations. The vapor pressure management apparatuses according to the present invention also inherently provide zero vacuum leakage, allow positive and negative pressure relief values to be designed by geometry, presents no mechanical moving parts and thus there is no wear, no filtration is required, reduced durability testing, no calibration is required, and a very low parts count to ease assembly and reduced manufacturing costs. Moreover, loss of the liquid 220,320 throughout the life of the fuel vapor pressure management apparatuses 200,300 can be made substantially negligible or completely eliminated by the helical flow paths.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A method of managing vapor pressure in a fuel system for supplying fuel to an internal combustion engine, the method comprising:
    locating a chamber in fluid communication between first and second ports, the first port being in fluid communication with the fuel system, and the second port being in fluid communication with atmosphere;
    disposing within the chamber a liquid separating the chamber into first and second portions; and
    minimizing entrainment of the liquid in a flow of a fluid between the first and second ports.

2. The method according to claim 1, wherein the minimizing comprises flowing fluid along a helical flow path between the liquid and at least one of the first and second ports.

3. The method according to claim 2, wherein the flowing the fluid through the liquid comprises bubbling through the liquid.

* * * * *